United States Patent [19]
Kai

[11] Patent Number: 5,287,309
[45] Date of Patent: Feb. 15, 1994

[54] HIGH-SPEED STACK MEMORY

[75] Inventor: Naoyuki Kai, Tokyo, Japan

[73] Assignee: Kabushiki Kaisha Toshiba, Kawasaki, Japan

[21] Appl. No.: 731,764

[22] Filed: Jul. 18, 1991

[30] Foreign Application Priority Data

Jul. 19, 1990 [JP] Japan .................................. 2-189463

[51] Int. Cl.$^5$ .............................................. G11C 8/00
[52] U.S. Cl. .......................... 365/189.04; 365/230.04
[58] Field of Search ...................... 365/189.04, 230.01, 365/230.02, 230.03, 230.04

[56] References Cited
U.S. PATENT DOCUMENTS
5,042,007  8/1991  D'Luna ..................... 365/230.02 X

OTHER PUBLICATIONS

Thomas C. Bartee, "Computer Architecture and Logic Design", 1991, pp. 455-456.
F. J. Hill and G. R. Peterson, "Digital Systems: Hardware Organization and Design", 1978, pp. 492-497.

Primary Examiner—Steven Mottola
Attorney, Agent, or Firm—Foley & Lardner

[57] ABSTRACT

A stack memory for high-speed operation comprises a RAM for storing data and a stack pointer for holding an address of the PUSH data. The POP data are always stored in an address smaller by "1" than the address for storing the PUSH data. According to this stack memory, both reading the POP data and storing PUSH data is simultaneously executed, then the one of them can be validated. Thus, it becomes possible to execute the access to the RAM before the data process mode is decided.

17 Claims, 3 Drawing Sheets

HIGH-SPEED STACK MEMORY

BACKGROUND OF THE INVENTION

1. Field of the Invention

The present invention relates to a stack memory employing a random access memory (RAM).

2. Description of the Prior Art

In conventional stack memories comprising so called Last-In-First-Out type memories, there are memories comprising a RAM.

Namely, in order to make such a stack memory function effectively, a RAM for receving and outputting data and a stack pointer comprising an up-down counter indicative of input and output addresses corresponding to data held in the RAM are required.

In such a stack memory, when write operation (PUSH) to the RAM is executed, external data are written to an address designated by the stack pointer, then the address is updated by incrementing it by "1". On the other hand, when a read operation (POP) from the RAM is executed, an address of the stack pointer is decremented by "1", then data are read out from a position designated by the decremented address.

Since the PUSH and POP operations of the stack memory are respectively carried out in such manners, it is necessary to decide in advance which of the POP and PUSH operations should be executed when access of the RAM is started. Namely, in such a conventional stack memory, the access operation of the RAM must be started after the PUSH or POP operation is decided. Therefore, in a system which uses such a conventional stack memory, the process speed is likely to be lowered.

For example, in case of a recursive algorithm where operation for temporarily holding data to be processed in a stack memory to read and use the data later on, the data process mode is first decided, then the data is processed in accordance with the PUSH operation to the stack memory or the POP operation from the stack memory.

In such a case, if the above-mentioned conventional stack memory is used, the access operation of the stack memory can not be started until the data process mode is decided. Therefore, the process speed is inevitably lowered.

Accordingly, in such a conventional stack memory, it is necessary to decide in advance which of the PUSH and POP operations should be executed before the access operation of the stack memory is started. Therefore, the process speed of the procedure including the operation relating to the stack memory is inevitably lowered.

SUMMARY OF THE INVENTION

Therefore, it is an object of the present invention to provide a high-speed processing stack memory.

It is another object of the present invention to provide a stack memory capable of executing access operations deciding before which of the PUSH and POP operations should be executed.

To achieve these objects, a first feature of the present invention is a stack memory which comprises a stack pointer for holding an address for use in storing push data and reading pop data, a two port RAM having first and second ports, and means connected with the stack pointer and the RAM in order to supply a first address to the RAM for storing push data through the first port and to supply a second address smaller than the first address, by one, to the RAM for reading pop data through the second port.

Moreover, a second feature of the present invention is a stack memory which comprises a stack pointer for holding an address for use in storing push data, a RAM divided into first and second memory banks, and circuit means connected with the pointer and the RAM for controlling read/write operations of the RAM in order to simultaneously execute storing push data corresponding to an even address in the first memory bank and reading pop data corresponding to an odd address from the second memory bank or storing push data corresponding to an odd address in the second memory bank and reading pop data corresponding to an even address from the first memory bank in accordance with the address held in the stack pointer.

Incidentally, with respect to the present invention, there are many modifications equivalent to the embodiments which will be described in detail hereinafter. These modifications are not specified here, however, it should be understood that a great many systems derivative and equivalent to the embodiments can be derived by simple mathematical transformation on designation of the addresses or on determination of the even or odd address in each memory field. Of course, it goes without saying that all of these modifications are in the scope of the present invention.

These and other objects, features and advantages of the present invention will be more apparent from the following description of a preferred embodiment, taken in conjunction with the accompanying drawings.

DETAILED DESCRIPTION OF THE EMBODIMENTS

Figure 1:
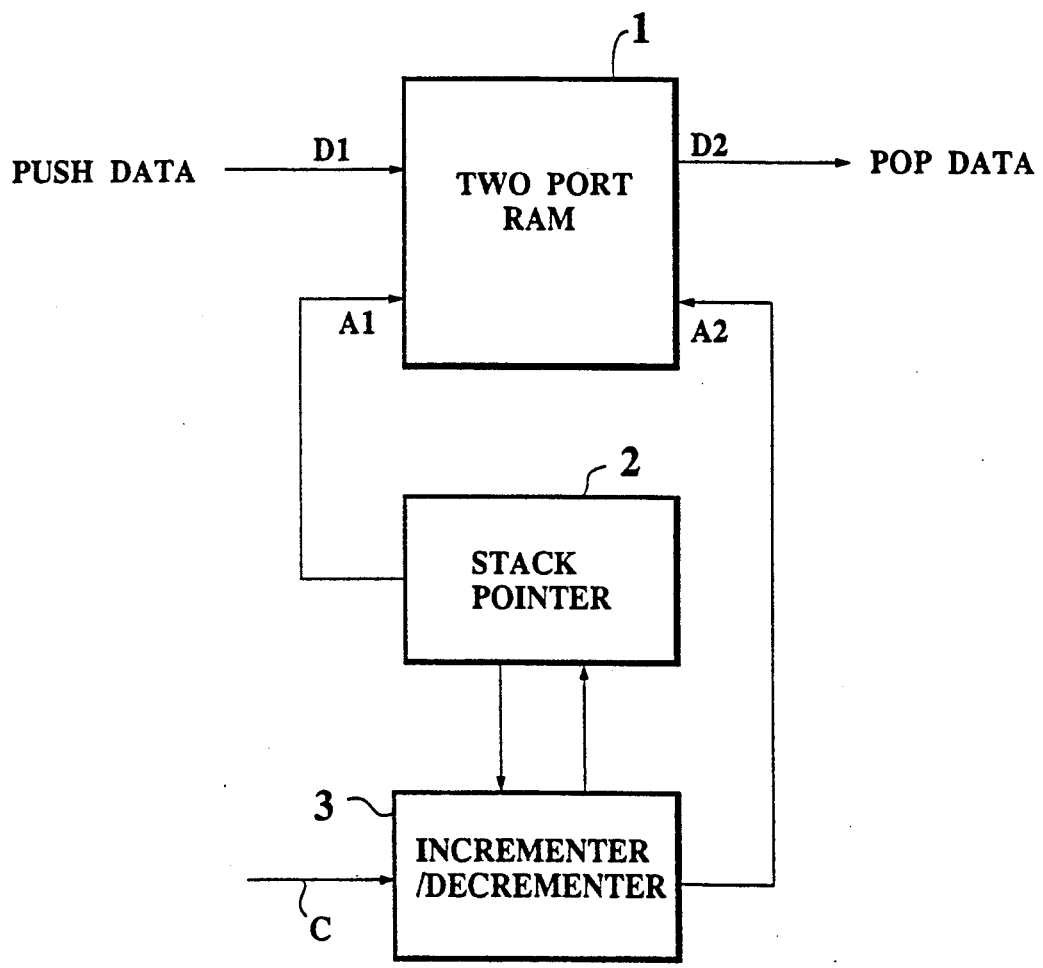
FIG. 1 is a diagram to show construction of a stack memory as a first embodiment of the present invention.

FIG. 1 is a block diagram showing construction of a stack memory as a first embodiment of the present invention.

In the same drawing, the stack memory has the following two features.

In the first feature, when data are successively stored in the stack memory in order from a lower address to a higher address, valid data are stored and held in an area from the lower address to an address determined by subtracting "1" from an address indicated by a stack pointer, and data stored in an area of from the address indicated by the stack pointer to the higher addresses are invalid.

According to the first feature, even if a PUSH operation is executed incorrectly, data to be processed by the PUSH operation are invalid, that is, the PUSH operation itself has no substantial effect since the value indicated by the stack pointer is not.

While in the second feature, an address of PUSH data and an address of POP data are always different from each other, moreover, these are respectively an even address and an odd address always different by "1" from each other.

Because of these two features, in the stack memory according to the present invention, the PUSH and POP operations are simultaneously started before a decision on which of the PUSH and POP operations should be executed, and the value of the stack pointer is updated after the execution of the PUSH or POP operation is decided.

In order to make this possible, in the embodiment shown in FIG. 1, the stack memory includes a two port RAM so as to simultaneously execute the PUSH and POP operations.

In FIG. 1, the stack memory comprises a two port RAM 1, a stack pointer 2 and an incrementer/decrementer 3. Incidentally, though these constructional elements are formed in one semiconductor chip, it is also possible to arrange them in different chips.

In the same drawing, the RAM 1 has a first port to be exclusively used for the PUSH (write) operation so that when PUSH data are supplied to D1 of the first port, an address corresponding to the PUSH data is given to A1 of the same port. Moreover, the RAM 1 has a second port to be exclusively used for the POP operation so that when POP data are outputted from D2 of the second port, an address corresponding to the POP data is given to A2 of the same port.

The stack pointer 2 holds an address corresponding to PUSH data to be processed next at the RAM 1. Namely, each address held in the stack pointer 2 is given to A1 of the first port of the RAM 1. Moreover, the address is also given to the incrementer/decrementer 3.

The incrementer/decrementer 2 increments or decrements the address given from the stack pointer 2 by "1". Then, the incrementer/decrementer 3 gives the incremented or decremented address to the stack pointer 2. Incidentally, the decremented address is supplied to A2 of the second port in the RAM 1.

In such construction, access operation of the stack memory is started before the PUSH or POP operation is decided. When the access operation is started, an address (N) is given to A1 of the RAM 1 from the stack pointer 2, and data supplied to D1 are written at the address (N) in the RAM 1.

In parallel with the PUSH operation, the address (N) is given to the incrementer/decrementer 3 from the stack pointer 2, and is then decremented by "1". Thereafter, the decremented address (N−1) is given to A2 of the RAM 1, and data stored at the address (N−1) are read out as POP data from D2 of the RAM 1. In such a manner, the PUSH and POP operations are started in parallel, thereafter when the PUSH or POP operation is decided, the address (N) of the stack pointer 2 is updated. Namely, when the PUSH operation is selected, the address (N) of the stack pointer 2 is given to the incrementer 3 so as to increment it by "1". Then, the incremented address (N+1) is given to the stack pointer 2, and stored therein as an address of the next access operation. As the result, the PUSH operation for storing data at the address N becomes valid.

On the other hand, when the POP operation is selected, the address (N−1) for the POP operation is given to the stack pointer 2 from the incrementer/decrementer 3, and stored therein as an address of the next access operation. As the result, the PUSH operation for storing data at the address N becomes invalid, while the POP operation for reading data from the address (N−1) becomes valid. The incrementer/decrementer 3 is given, for this purpose, signal C indicative of which operation (PUSH or POP) is selected. In accordance with this signal C, the incrementer/decrementer 3 updates the address for use in storing push data by increment or decrement.

As stated above, by using the two port RAM as a stack memory, the access operation of the stack memory can be started before the PUSH or POP operation is decided.

Figure 2:
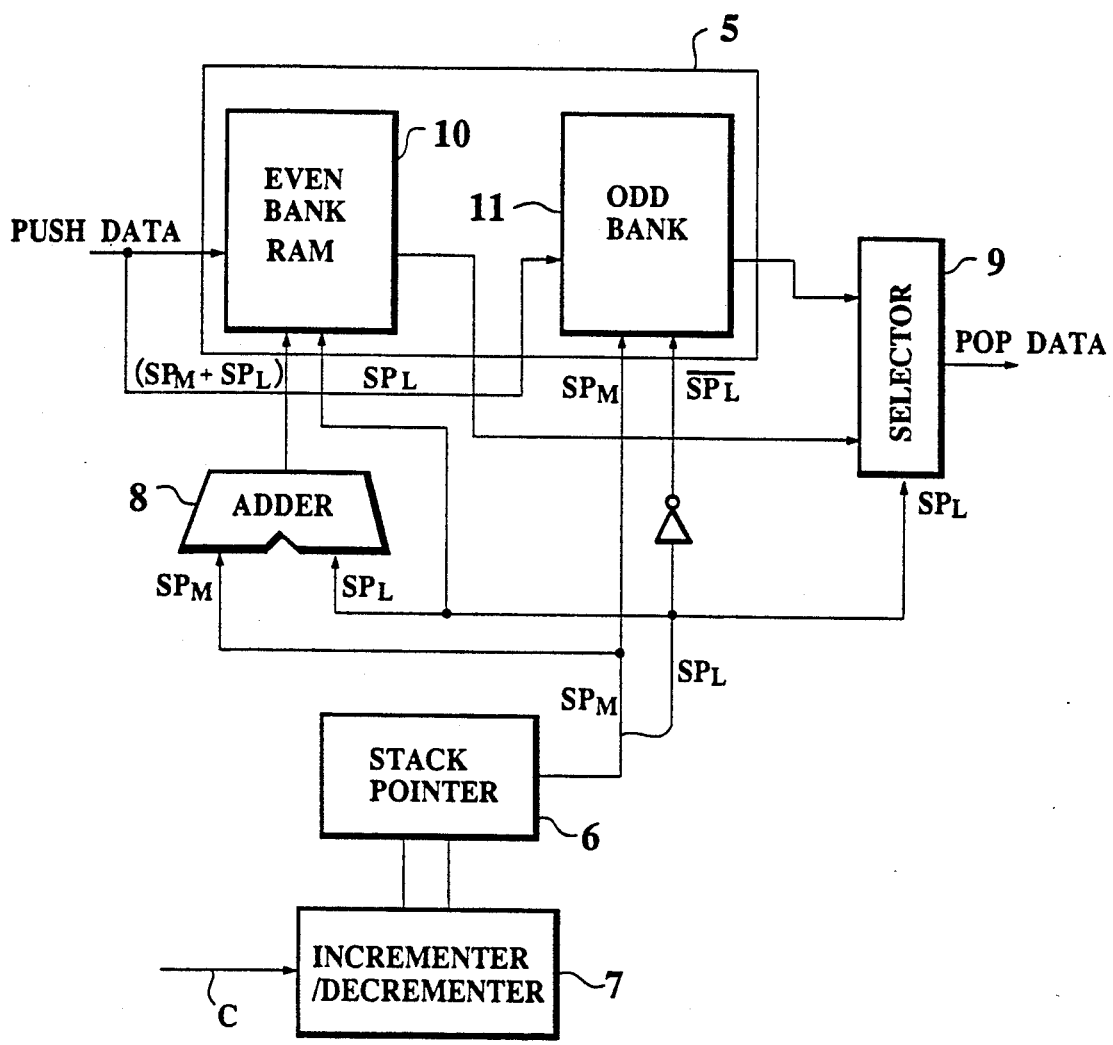
FIG. 2 is a diagram to show construction of a stack memory as a second embodiment of the present invention.

FIG. 2 shows construction of a stack memory as second embodiment according to the present invention. As shown in the same drawing, the second embodiment includes two banks of circuit blocks so as to realize simultaneous execution of the PUSH and POP operations by utilizing the above-mentioned second feature of the present invention.

In FIG. 2, the stack memory comprises a RAM 5, a stack pointer 6, an incrementer/decrementer 7, an adder 8 and a selector 9. Incidentally, it is possible to arrange all of these constructional elements in one semiconductor chip, otherwise, only the RAM 5 may be arranged as one chip.

Moreover, the RAM 5 comprises two banks, i.e., an even bank 10 and an odd bank 11. Each of the banks 10, 11 is composed of an independent one port RAM having separate input and output terminals. Incidentally, because the data to be inputted to these banks are the same, it is also possible to provide a common input terminal in place of the separate ones. Alternatively, each of the banks 10 and 11 may be provided with a single terminal which is commonly used for reading and writing operation. In such a case, the configuration has to be slightly modified, rather than having the two terminals for exclusive use respectively in reading and writing.

To the even bank 10 are allocated even addresses for all addresses in the stack memory, so as to input and output data corresponding to each even address.

Odd bank 11 is allocated odd addresses for all addresses in the stack memory, so as to input and output data corresponding to each odd address.

Accordingly, an address p of the even bank 10 corresponds to an address 2p of all addresses in the stack memory, and an address 9 of the odd bank 11 corresponds to an address (2q+1) of all addresses in the stack memory. In such a case, when an even address in the stack memory is indicated by the stack pointer 6, the POP operation is executed in the even bank 10, while the PUSH operation is executed in the odd bank 11. On the other hand, when an odd address is indicated by the stack pointer, the PUSH operation is executed in the even bank 10 and the POP operation is executed in the odd bank 11.

The stack pointer 6 holds an address over all of the stack memory for indicating data to be processed by the POP operation. Therefore, an address for indicating data to be processed by the PUSH operation is designated by (SP+1) when an address of the stack pointer 6 is SP.

When an even address (2r) is held in the stack pointer 6, data to be processed by the POP operation correspond to an address r in the even bank 10, while data to be processed by the PUSH operation correspond to the address r in the odd bank 11. On the other hand, when an odd address (2r+1) is held in the stack pointer 6, data to be processed by the POP operation correspond to the address r in the odd bank 11, while data to be processed by the PUSH operation correspond to an address (r+1) in the even bank 10.

Accordingly, the odd bank 11 is given the address r irrespectively of whether the address of the stack pointer 6 is even (2r) or odd (2r+1). In this case, the address r is designated by SP/2 when SP is even or by (SP−1)/2 when SP is odd.

As the result, since an address ($SP_M$) of a bit row, formed by removing the least significant bit ($SP_L$) from an address of the stack pointer 6, can be expressed by SP/2 or (SP−1)/2, the address ($SP_M$), without the least significant bit of the address of the stack pointer 6, is given to the odd bank 11.

On the other hand, the even bank 10 is given the address r when the address of the stack pointer 6 is even (2r), while is given the address (r+1) when odd (2r+1). To realize this, the least significant bit ($SP_L$) is added by the adder 8 to the address ($SP_M$) formed from the least significant bit ($SP_L$) from the address of the stack pointer 6, and the obtained value is provided to the even bank 10 as an address.

In such operation, because the least significant bit ($SP_L$) is "0" when the address of the stack pointer 6 is even (2r), the sum ($SP_M+SP_L$) of the corresponding address ($SP_M$) and the least significant bit ($SP_L$) becomes "r", so that the addition result is given as address r to the even bank 10. On the other hand, because the least significant bit ($SP_L$) is "1" when the address of the stack pointer 6 is odd (2r+1), the sum ($SP_M+SP_L$) of the corresponding address ($SP_M$) and the least significant bit ($SP_L$) becomes "r+1", so that the addition result is given as address (r+1) to the even bank 10.

Moreover, the least significant bit ($SP_L$) of the address of the stack pointer 6 is given to both the even bank 10 and the selector 9, and the inversion of the least significant bit ($\overline{SP_L}$) is given to the odd bank 11. In this case, the even bank 10, odd bank 11 and selector 9 respectively judge whether the address of the stack pointer 6 is even or odd based on the value of the least significant bit ($SP_L$), and the process operation is selected in response to the judgement result.

While, the incrementer/decrementer 7 increments or decrements the address of the stack pointer 6 by "1" in accordance with signal C in the same manner as in the first embodiment, then gives the incremented or decremented address to the stack pointer 6. As the result, the incrementer/decrementer 7 constructs an up-down counter together with the stack pointer 6.

The selector 9 selects data read out from the even bank 10 or odd bank 11 based on the least significant bit ($SP_L$) given from the stack pointer 6, then deals with the selected data as POP data of the stack memory.

Incidentally, the selector 9 selects data read out from the even bank 10 when the address of the stack pointer 6 is even and the value of the least significant bit ($SP_L$) is "0", while selector 9 selects data read out from the odd bank 11 when the address of the stack pointer 6 is odd and the value of the least significant bit ($SP_L$) is "1".

In such a construction, when the address of the stack pointer 6 is even (2r), an address r of the address ($SP_M$) is given from the adder 8 to the even bank 10, while the odd bank 11 receives the address r of the address ($SP_M$) formed by removing the least significant bit from the address of the stack pointer 6, for indicating the access operation. Accordingly, $SP_L$ and $SP_L$, i.e., "$\phi$" and "1" are respectively given to the even and odd banks as RW control signals for indicating the even bank to function for reading and the odd bank to function for writing.

As the result, data are read out from the address r in the even bank 10, while PUSH data given from the outside are written in the address r in the odd bank 11. Then, the data read out from the even bank 10 are selected by the selector 9, and outputted as POP data of the stack memory.

In this case, when the even bank 10 and the odd bank 11 are considered to be one unit, i.e., the RAM 5, the operation is equivalent to parallel execution of the data POP operation from the address 2r in the stack memory and the data PUSH operation to the address (2r+1) in the stack memory. Namely, the data POP indicated by an address of the stack pointer 6 and the data PUSH to an address defined by adding "1" to the address are executed in parallel.

Moreover, when the PUSH or POP operation is decided after such access operation is started, the address of the stack pointer 6 is updated. Namely, when the access operation is the PUSH operation, the address of the stack pointer 6 is incremented by "1" by the incrementer/decrementer 7, then the incremented address is given to and stored in the stack pointer 6, so as to make the PUSH operation valid. On the other hand, when the access operation is the POP operation, the address of the stack pointer 6 is decremented by "1" by the incrementer/decrementer 7, then the decremented address is held in the stack pointer 6, so as to make the POP operation valid.

While, when the address of the stack pointer 6 is odd (2r+1), an address (r+1) of the address ($SP_M+1$) is given to the even bank 10 as output of the adder 8, while is given to the odd bank 11 an address r of the address ($SP_M$) comprising taking off the least significant bit of the address of the stack pointer 6, for indicating the access operation. Accordingly, $SP_L$ and $SP_L$, i.e., "1" and "$\phi$" are respectively given to the even and odd banks as RW control signals for indicating the even bank to function for reading and the odd bank to function for writing.

As the result, PUSH data provided externally are written at the address (r+1) of the even bank 10, while data are read out from the address r of the odd bank 11. Then, the data read out from the odd bank 11 are selected by the selector 9, and outputted as POP data of the stack memory.

In this case, when the even bank 10 and the odd bank 11 are considered to be one unit, i.e., the RAM 5, the operation is equivalent to parallel execution of the data POP operation from the address (2r+1) in the stack memory and the data PUSH operation to the address (2r+2) in the stack memory. Namely, the data POP indicated by an address of the stack pointer 6 and the data PUSH to an address defined by adding "1" to the address are executed in parallel.

Moreover, when the PUSH or POP operation is decided after such access operation is started, the address of the stack pointer 6 is updated like the case when the address is even.

Accordingly, also in such a construction, it becomes possible to simultaneously start the PUSH and POP operations and to validate the one of these two operations after it is decided. Next, a case where the above-mentioned stack memory is incorporated into a system to execute a recursive algorithm is explained.

Figure 3:
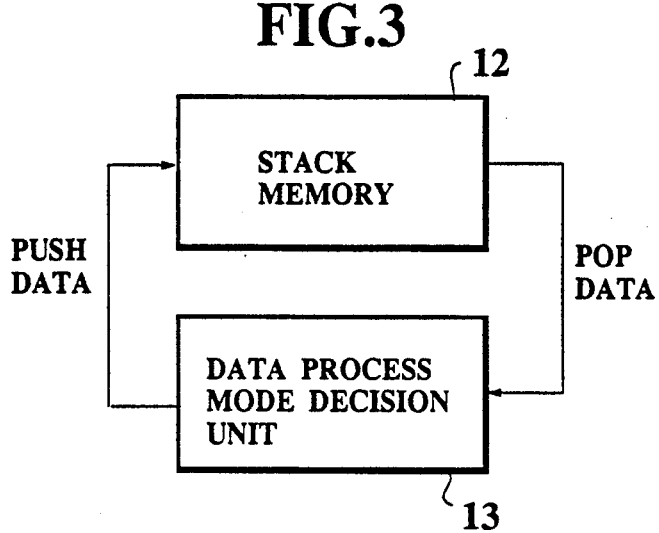
FIG. 3 is a diagram to show construction for realizing a recursive algorithm in which a stack memory is used.
Figure 4:
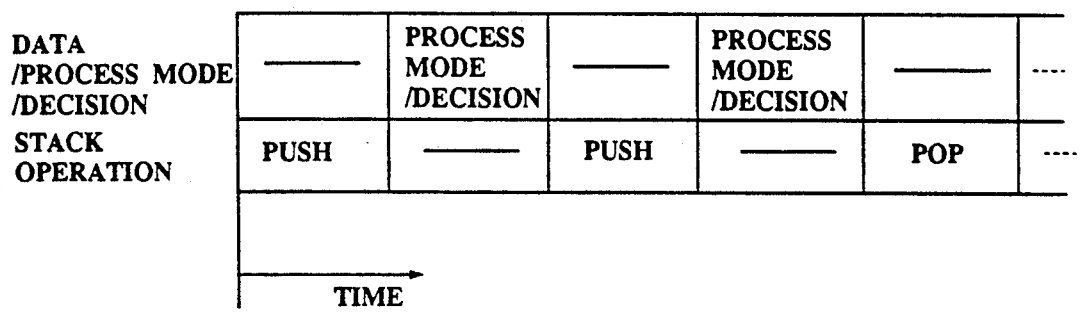
FIG. 4 is a timing chart to explain a process in which a conventional stack memory is used.

In the case where the recursive algorithm is constructed by a conventional stack memory 12 and a data process mode decision unit 13 as shown in FIG. 3, access operation of the stack memory 12 can not be started until the operation of the stack memory 12 is decided even when the data process mode decision by the decision unit 13 and decision of the next operation of the stack memory 12 are executed in parallel. Therefore, as shown in a timing chart of FIG. 4, the decision of the stack memory operation and actual operation of the stack memory are executed serially, so that the time required for one cycle of the whole stack memory operation must be the sum of the decision time and actual operation time.

Figure 5:
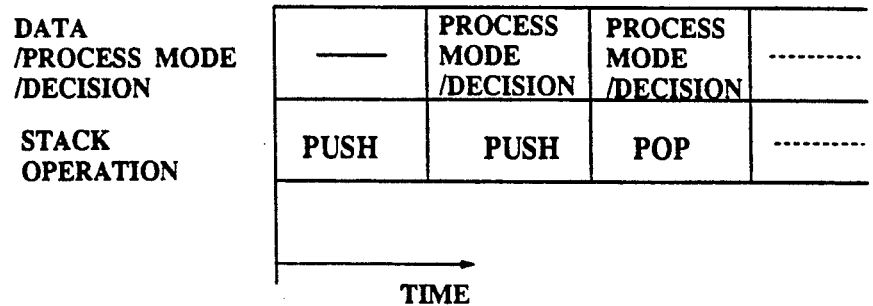
FIG. 5 is a timing chart to explain a process in which a stack memory according to the present invention is used.

On the other hand, according to the above-mentioned embodiments of the present invention, the stack memory operation can be executed just after the data process. Accordingly, the PUSH or POP operation has only to be decided by the time the stack memory operation is finished. Thus, as shown in FIG. 5, it becomes possible to simultaneously execute the decision of the data process mode or stack memory operation mode and the actual stack memory operation. As the result, the time required for one cycle of the whole stack memory operation is the longer of the decision time and actual operation time. Accordingly, with the stack memory of the present invention, the process speed becomes, at a maximum, twice the speed of the conventional technology.

Incidentally, the present invention is not limited to the systems described in the above-mentioned embodiments. For example, it is possible to arrange the system so that data may be successively stored in an address in order of from the highest to the lowest. Moreover, it is also possible to arrange the system so that the area to or from which data of the stack memory are transferred may be a partial address area of another memory.

Various modifications will become possible for those skilled in the art after receiving the teachings of the present disclosure without departing from the scope thereof.

What is claimed is:

1. A stack memory comprising:
   a stack pointer for holding an address for use in storing push data and reading pop data;
   a two port RAM having first and second ports;
   means connected with said RAM for supplying a first address to said RAM for storing push data through said first port and for supplying a second address smaller than said first address by one, to said RAM, for reading pop data through said second port, said storing and said reading being performed at the same time; and
   means connected to said pointer for selectively incrementing or decrementing the address in said stack pointer in order to make effective only one of said storing and said reading.

2. The stack memory of claim 1 wherein said address stored in said pointer is said first address.

3. The stack memory of claim 2 wherein said means connected to said RAM comprises a supply line directly connected between said first port and said stack pointer in order to supply said address stored in said pointer to said first port as said first address and a decrementer connected with said address stored in said pointer and supply the decremented address to said second port as said second address.

4. The stack memory of claim 3 wherein said decrementer is adapted also to increment said address stored in said pointer after push data is validated.

5. A stack memory comprising:
   a stack pointer for holding an address for use in storing push data;
   a RAM divided into first and second memory banks; and
   circuit means connected with said pointer and said RAM for controlling read/write operation of said RAM in order to simultaneously execute storing push data corresponding to an even address in said first memory bank and reading pop data corresponding to an odd address from said second memory bank or storing push data corresponding to an odd address in said second memory bank and reading pop data corresponding to an even address from said first memory bank in accordance with the address held in said stack pointer.

6. The stack memory of claim 5 further comprising a selector connected with output ports of said first and second memory banks and said pointer in order to selectively output pop data from said first or second memory bank in accordance with whether the address stored in said pointer is odd or even.

7. The stack memory of claim 5 further comprising an increment/decrement circuit connected with said stack pointer for incrementing said address held therein when said push data is validated and decrementing said address held therein when said pop data is validated.

8. A stack memory comprising:
   a stack pointer for outputting an address SP for use in storing push data;
   a first RAM connected with said stack pointer for receiving the least significant bit of said address SP from said pointer as a control signal indicative of whether read or write operation should be executed for said first RAM;
   an adder connected with said pointer and said first RAM for supplying SP/2 when said address SP is even or (SP-1)/2+1 when said address SP is odd to said first RAM as an address for accessing said first RAM;
   a second RAM connected with said stack pointer for receiving the inverse of the least significant bit of said address SP from said pointer as a control signal indicative of whether read or write operation should be executed for said second RAM and receiving SP/2 when SP is even or (SP-1)/2 when SP is odd as an address for accessing said second RAM; and
   a selector connected with said first and second RAMs and the least significant bit in order to output pop data stored in said first second RAM corresponding to said address SP in accordance with the sense of the least significant bit.

9. The stack memory of claim 8 further comprising an increment/decrement circuit connected with said stack pointer for incrementing said address SP when said push data is validated and decrementing said address SP when said pop data is validated.

10. The stack memory of claim 8 wherein said adder directly receives the output of said pointer except for the least significant bit as an addend and the least significant bit as an augend.

11. The stack memory of claim 8 wherein said second RAM is connected to the least significant bit through an inverter.

12. The stack memory of claim 8 wherein said stack memory is formed within one semiconductor chip.

13. A stack memory comprising:
   a multi-port RAM having an input port and an output port which can be used at the same time;
   a stack pointer connected to said RAM for indicating an address of said RAM corresponding to a last-input data, said RAM performing push and pop operations in accordance with the address indicated by said stack pointer; and
   means connected to said RAM and said pointer for selectively incrementing or decrementing the address indicated by said pointer in order to make effective only one of said push and pop operations.

14. The stack pointer of claim 13 wherein said stack pointer holds the address of the last-input data.

15. The stack pointer of claim 13 wherein said stack pointer holds an address adjacent to the address of the last-input data.

16. The stack memory of claim 13 wherein said push and pop operations are performed simultaneously.

17. The stack pointer of claim 5 further comprising means connected to said pointer for selectively incrementing or decrementing the address in said order to make effective only one of said storing push data and said reading pop data.

* * * * *